March 19, 1968    J. F. RINGELMAN    3,374,421

TRANSIENT LIMITING CURRENT

Filed Dec. 2, 1964

INVENTOR
JOHN F. RINGELMAN

BY
Claude Funkhouser
ATTORNEY

Robert F. Beers
AGENT

United States Patent Office 3,374,421
Patented Mar. 19, 1968

3,374,421
TRANSIENT LIMITING CURRENT
John F. Ringelman, Glen Burnie, Md., assignor, by mesne assignments, to the United States of America as represented by the Secretary of the Navy
Filed Dec. 2, 1964, Ser. No. 415,520
11 Claims. (Cl. 323—22)

ABSTRACT OF THE DISCLOSURE

A circuit for protecting an A.C. power supply circuit from transients having a network containing SCR's and diodes and a transistor network coupled to the control electrodes of the SCR's. A Zener diode is coupled between the base of the transistor and a differential amplifier circuit which is responsive to a voltage control network which is coupled to a diode rectifier circuit which is responsive to the output of the A.C. circuit to enable the differential amplifier circuit to control the Zener diode to activate the transistor to enable the SCR's to conduct under normal operating conditions and to impede current when excessive voltage appears on the A.C. circuit.

---

This invention relates to electronic voltage regulator circuitry and more particularly to semiconductor circuitry for protecting electronic components of regulated power supplies from destruction due to turn-on and line transient voltages.

Many types of electronic circuitry apparatus require a constant output direct current voltage regulated against variations in input voltages. Conventional regulated power supplies in numerous applications usually employ transistorized circuitry for controlling the voltage output of the power supply above and below the nominal output voltage. Usually, the transistorized circuitry takes the form of circuitry which varies in conductivity as the output voltage varies and this characteristic is used to restore the power supply output voltage to its nominal value. A distinct disadvantage in this type of regulated power supply apparatus is that the power requirements of the controlled transistorized circuitry may be exceeded by turn-on transients due to ringing occurring in the filter section of the regulated power supply or to line transients generated in the power source. In many cases, the regulated power supply must be able to withstand line transients of a few seconds' duration with peak magnitudes substantially above normal operating voltages. Therefore, it is necessary to provide protective devices in regulated power supply circuitry, particularly those using semiconductors, which can faithfully withstand these turn-on and line transient voltage magnitudes.

The use of conventional overload devices such as fuses and circuit breakers have been wholly unsatisfactory as protective devices for transistorized electronic regulated power supplies which need fast-acting or short-time constant circuit-breaking action to prevent damage to the power supply's transistorized circuitry elements from overloads. The most common of the conventional overload devices and the most frequently used is the fuse. The fuse is an expendable device which opens or disconnects the electronic circuit from the power source whenever the current through the electronic circuitry becomes excessive. It consists principally of a section of fusable element of such properties and physical proportions that excessive current flow through the element will melt it and thereby sever the circuit from the power source. The time required to melt the element depends upon the value of current flow and also depends upon the size, shape and material of the fusable element. At best, the fuse is a slow-acting device which is totally inadequate for circuitry systems which require fast-acting and reliable opening of the power source circuit upon short-time power overloads through the system. The circuit breaker on the other hand is a mechanical device which opens an electric circuit whenever excessive current flows through the circuit. The circuit breaker is a much faster device in opening the circuit, over the fuse, but it is still considered slow-acting for the required protection against turn-on transients or line transients. Further, the circuit breaker, by its inherent characteristics, requires a device which is usually bulky, mechanically complex and expensive.

The transient limiting circuitry disclosed may be used in power feed lines of either three phase or single phase that are used as a supply source to a single voltage regulator or to a system of voltage regulators. This technique and circuitry allows the utilization of a common means of limiting transients to all power supply regulators in which line transients are a problem. The transient overshoot voltage is suppressed in one of the phases between the three phase input generator and the primary of a power transformer. This power transformer in turn supplies power from its secondary windings to rectifiers, LC filters, and voltage regulators. By this technique of partially opening one of the phases of a three phase system, the output voltage may be reduced up to 34% of the nominal operating voltage. Control circuitry is used to detect the magnitude of the line voltage present at the output of the three phase generator and this information is used for applying control signals to the suppression circuitry in the three phase feeder lines. Thus, the instant transient limiting circuitry provides a completely electronic suppressing means that provides protection for either a single regulated power supply or a system of regulated power supplies from line transient voltages which may be generated in the power generating circuit.

An object of the present invention is to provide an improved transient limiting circuitry arrangement for protecting regulated power supplies from line transients.

Another object of the present invention is to provide a completely electronic apparatus for the suppression of line source transients.

A further object of the present invention is to provide a completely electronic apparatus for opening all three lines of a three phase system during over-voltage transients.

Still another object of the present invention is the provision of an electronic circuitry apparatus configuration that is dependable, reliable and inexpensive.

Another object of the present invention is the provision of electronic circuitry apparatus that effectively suppresses line transients or turn-on transients to a safe level.

A further object of the present invention is the provision of protective circuitry apparatus that permits the use of semiconductor control elements in a system of regulated power supplies.

Another object of the present invention is the provision of electronic circuitry which may be used with conventional regulated power supply circuits to provide them with protection against generating voltage source transients or turn-on voltage transients.

A further object of the present invention is the provision of a transient limiting circuitry that is used in a three phase system of power for providing protection from line transients to a plurality of voltage regulators connected to this system of power.

A further object of the present invention is the provision of a method for protecting a system of regulated power supplies from line and/or turn-on transients.

Other objects, advantages and novel features of the invention will become apparent from the following detailed description of the invention when considered in conjunction with the accompanying drawings wherein.

Figure 1:
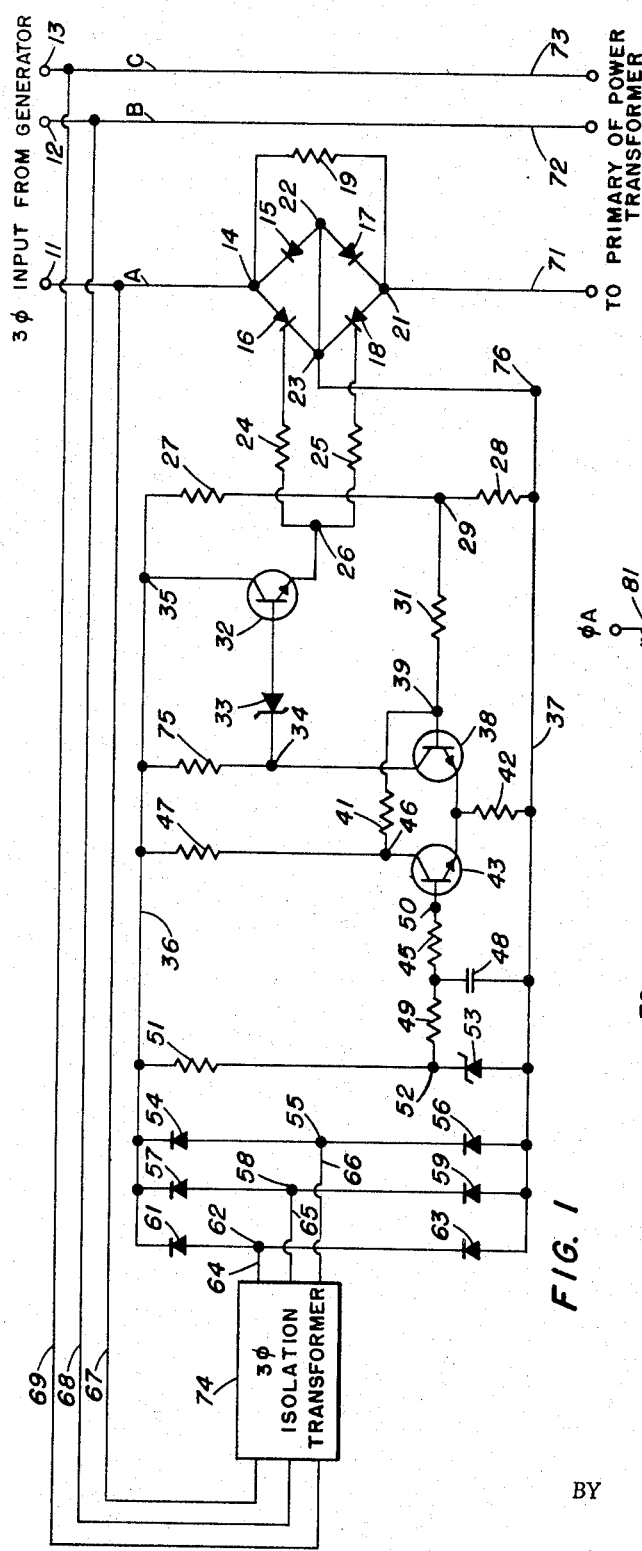
FIG. 1 is a schematic circuit diagram of the invention.

With reference now to FIG. 1, there is shown three power lines 11, 12 and 13, respectively, connected to a three phase generator voltage supply source, not shown. Each of the power lines are connected to one phase of the three phase voltage. These phases are designated for purposes of convenience as phases A, B and C, respectively. Line 11 conducting phase A, as shown, is modified by the insertion of a semiconductor bridge between the power generating source and the primary of a power transformer connected to lines 71, 72 and 73, respectively. The bridge is formed by connection of the cathode of diode 15 to the anode of silicon controlled rectifier 16 via terminal 14. Also electrically tied to terminal 14 is line 11 and resistor 19. The other end of resistor 19 is electrically connected between terminal 14 and terminal 21 and in this way effectively parallels the bridge circuit. Junction 23 of the diode bridge is formed by the connection of the cathode of the silicon controlled rectifier 16 to the cathode of silicon controlled rectifier 18, and bridge junction 22 is formed by the connection of the anode of diode 17 to the anode of diode 15. Junction 23 and junction 22 are electrically connected together. Junction 21 of the diode bridge is formed by electrically connecting the anode of silicon controlled rectifier 18 to the cathode of diode 17. An electrical lead 71 connects this junction to one of the primary windings of the power transformer, not shown. Electrical leads 71, 72 and 73 conducting phases A, B and C, respectively, are used to feed these respective voltages to the respective primary windings of a power transformer that in turn supplies power from its secondary winding to additional electronic apparatus, such as, rectifiers, LC filters, and regulators.

The bridge circuitry in the electrical line of phase A of the three phase voltage is controlled by the following circuitry. The magnitude of the generator voltage on the respective power leads 11, 12 and 13, respectively, are electrically coupled by means of leads 67, 68 and 69 to the primary windings of a three phase isolation transformer 74. This isolation transformer is shown functionally as block 74 and may be any suitable three phase isolation transformer. Electrically connected to the secondary of transformer 74 are electrical leads 64, 65 and 66, respectively. These leads are connected to junctions 55, 58 and 62, respectively. These respective junctions are formed by the series connection of a pair of diodes of each of a three pair diode system. The first pair of diodes being formed by connecting the anode of diode 61 to junction 62, the cathode of diode 63 to junction 62 and the cathode of 61 to line 36 and the anode of diode 63 to line 37. The other two sets of rectifying diodes are made up in the same manner as the first set of diodes explained above. Diode 57 and diode 59 are connected together and across the circuitry to form the second diode pair and diodes 54 and 56 are electrically connected together and across lines 36 and 37 to form the third pair. These sets of diodes provide the rectification for each of the respective phases; phases A, B and C emanating from the generator input. Resistor 51 and Zener diode 53 are electrically connected in series to form a resistive diode network electrically connected across lines 36 and 37. The connection of one end of resistor 51 to Zener diode 53 forms junction 52. A resistive-capacitive network is connected between junction 52 and transistor 43 by tying resistor 45 in series with resistor 49 to the base of transistor 43. A capacitor 48 is electrically connected between the two resistors and line 37. The collector of transistor 43 is connected to line 36 via junction 46 and collector resistor 47. The two emitters of transistors 38 and 43 are tied electrically together and tied to line 37 via emitter resistance 42. The collector of transistor 38 is electrically connected to line 36 via junction 34 and collector resistance 75. The collector of transistor 43 at junction 46 is further electrically connected to the base of transistor 38 at junction 39 by resistor 41. The remainder of the base circuitry for transistor 38 is formed by the connection of resistor 27 to line 36 and the connection of the other side of this resistor to resistor 28 that has its other side connected to line 37. The junction 29 formed by the connection of these respective resistors is electrically connected to the base of transistor 38 via resistance 31. Electrically coupled to junction 34 that is formed by the connection of collector resistor 75 and the collector of transistor 38 is the cathode of Zener diode 33; the anode of the Zener diode 33 being electrically coupled to the base of transistor 32. The collector of transistor 32 is electrically coupled to line 36 at junction 35 and its emitter is electrically coupled to the two control elements on the silicon controlled rectifiers 16 and 18, respectively. This connection is made through a parallel arrangement of resistors 24 and 25. One side of these resistors is connected to the respective control electrodes and the other sides are electrically connected together at junction 26.

Generally, in operation, consider the action of the action of the semiconductor bridge in phase A, this being best shown in FIG. 1, as it is gated on and off in accordance with the magnitude of voltage detected by the transistorized detection circuitry. As shown, lines 11, 12 and 13, respectively, are fed from a three phase generator to the primary of a power transformer, not shown, via lines 71, 72 and 73, respectively. The secondary of the power transformer in turn supplies power to rectifiers, LC filters, and regulators, not shown. As pointed out above, this semiconductor bridge is constructed of two controlled rectifiers 16 and 18, respectively, and two diodes 15 and 17, respectively, forming the arms of a diode bridge circuit. If silicon controlled rectifier 18 is gated on, current in the line of phase A may flow through silicon controlled rectifier 18 and diode 15. If silicon controlled rectifier 16 is gated on, current flows through silicon controlled rectifier 16 and diode 17. If neither of the silicon controlled diodes 16 and 18 are gated on, the current in phase A will be conducted only through resistor 19. Thus, with the silicon controlled rectifiers 16 and 18 gated on continuously and with nominal line voltage on each of the respective phases A, B and C, the voltage output on the LC filters connected to the secondaries of the power transformer will be at their nominal values. With the gate voltage removed from silicon controlled rectifiers 16 and 18, phase A will be partially open and the output voltage of each LC filter will be reduced. The amount of reduction in voltage output of each LC filter will depend upon the value of the resistance 19. If resistance 19 is made infinite, then the voltage will be reduced to 34% of the nominal voltage value.

As illustrated in FIG. 1, the controlled circuitry couples voltages from each of the respective phases of the three phase generator via lines 67, 68 and 69 to an isolation transformer 74. The voltage from the isolation transformer is coupled to a system of rectifiers, diodes 54, 56, 57, 59, 61 and 63. The rectified voltage from the diodes is a three phase full wave rectified output voltage that appears between lines 36 and 37. When the three phase line voltage is in its normal voltage range or higher, Zener diode 53 tends to hold the potential of the base of transistor 43 constant. A fixed fraction of the voltage appearing across lines 36 and 37 is applied to the base of transistor 38 by the resistance divider network of resistors 27 and 28, respectively. As long as the voltage at junction 50 is always substantially larger than the peak value voltage at junction 39, transistor 43 will be in saturation and transistor 38 will be cut off as in a conventional differential amplifier. Under this condition, the voltage at the cathode of Zener diode 33 (junction 34) is nearly equal to the voltage on line 36. Whenever the voltage at junction 34 is at this level, it is considerably in excess of the voltage required to break down Zener diode 33. Once Zener diode 33 breaks down, base current flows in transistor 32, causing transistor 32 to conduct to allow gate current to flow through resistors 25 and 24 to the gating electrodes on the respective silicon controlled rectifiers 16 and 18. With the silicon controlled rectifiers 16 and 18 gated on continuously, the output voltage on the secondaries of the power transformer which is connected to the LC filters will be at their nominal voltage values.

Whenever an overvoltage transient begins, the voltage across lines 36 and 37 will increase above the predetermined limit. This condition is where the peak voltage magnitude at junction 39 becomes about equal to the voltage at the junction 50. At this point, transistor 43 begins to come out of saturation causing the voltage at junction 46 to further increase the voltage at junction 39. By this positive feedback action, the detector circuit is caused to trigger to its second stable state where transistor 43 is cut off and transistor 38 is saturated. The feedback resistor 41 connecting junction 46 to junction 39 is usually made small enough to permit the voltage at junction 39 to remain above the voltage at junction 50, during the time that the voltage across lines 36 and 37 are at a minimum throughout the overvoltage condition. With transistor 38 in saturation, the voltage at junction 34 is lower than the breakdown voltage of the Zener diode 33 and transistor 32 is not conducting. As a consequence, gate signal is removed from silicon controlled rectifiers 16 and 18, respectively.

As the line transient disappears, the voltage across lines 36 and 37 decreases to its nominal voltage range. This causes the voltage at junction 39 to decrease, thus allowing transistor 43 to come out of the cut-off state. As transistor 43 starts to conduct again, through positive feed-back action, the detector circuit triggers to its normal state cutting off transistor 38 and causing transistor 32 to conduct to again send current to gate on the silicon controlled rectifiers 16 and 18, respectively.

The action of the detection circuit in limiting turn-on transients at the output of the LC filters is as follows: when the three phase line, lines 11, 12 and 13 from the generator are first turned on, the voltage at the base of transistor 43 (junction 50) rises relatively slowly to its final voltage value, due to the charge time of capacitor 48. Since the voltage at junction 39 appears at its final voltage value instantaneously, the detector circuit starts in its overvoltage state and holds line A open by removing gating current from silicon controlled rectifiers 16 and 18.

This action causes and input voltage to the LC filter to be much lower than normal; the transient overshoot which does result is relatively low in absolute magnitude. Whenever the voltage on the base of transistor 43, junction 50, becomes larger than the voltage at junction 39, the base of transistor 38, the semiconductor bridge silicon controlled rectifiers 16 and 18 are gated on and line 11 or phase A is switched in to the circuit. The LC filter, again, will have a transient overshoot, but since the input voltage change is relatively small, the overshoot voltage is also reduced to a safe level.

Figure 2:
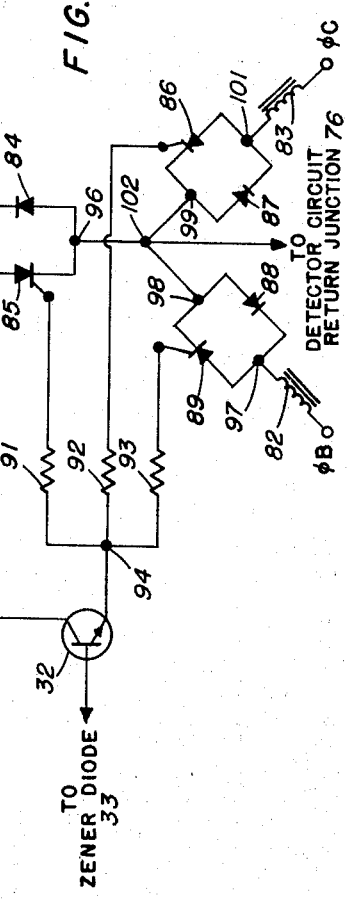
FIG. 2 is a schematic circuit diagram of another embodiment of the invention.

Considering now FIG. 2, which shows a modification of the circuitry of FIG. 1, all of the detection circuitry as explained in FIG. 1 is used in the same manner as the circuitry of FIG. 2. This circuitry is not shown, since it is the same and provides the same function up to transistor 32. In the modified circuitry, transistor 32 is connected in this manner. The base is connected to the anode of Zener diode 33 and its collector is connected to junction 35. The emitter is connected to a silicon controlled rectifier and diode network in each line of the three phase power system.

Phase A is coupled to junction 95 through the primary of power transformer primary 81. Diode 84 has its cathode coupled to the anode of silicon controlled rectifier 85 via junction 95. The cathode of silicon controlled rectifier 85 is electrically coupled to diode 84's anode via junction 96, and junction 96 is electrically tied to junction 102. The control electrode of silicon controlled rectifier 85 is coupled via a series resistance 91 to junction 94. Phase B is coupled to junction 97 via the power transformer's primary winding 82. The silicon controlled rectifier 89 has its anode electrically coupled to the cathode of diode 88 via junction 97. The anode of diode 88 is electrically coupled to the cathode of the silicon controlled rectifier 89 via junction 98 which in turn is tied to junction 102. The control electrode of silicon controlled rectifier 89 is coupled to junction 94 via series resistance 93. Phase C is coupled to junction 101 via primary transformer winding 83. Electrically coupled together via junction 101 are the anode of silicon controlled rectifier 86 and the cathode of diode 87. The cathode of silicon controlled rectifier 86 is coupled to the anode of diode 87 via junction 99 which is tied to junction 102. Junction 102 is electrically coupled to the detector circuit return junction 76. Three phase voltage for phases A, B and C are obtained from a three phase input generator system, not shown.

In operation, referring to FIG. 2, the respective silicon controlled rectifier circuits either pass or block the alternating current line voltage. In the quiescent state, normal operation, transistor 32 is conducting and sends current to the control electrodes of the silicon controlled rectifiers 85, 86 and 89 via resistors 91, 92 and 93, placing them in their gated on states. When the alternating current line voltage exceeds a predetermined value, the detection circuit as shown in FIG. 1 detects this line voltage excursion from normal and the current to the respective silicon controlled rectifiers from transistor 32 will be cut off and the respective silicon controlled rectifiers are put in their blocking states. When the alternating current line voltage goes below the predetermined value, the respective silicon controlled rectifiers will be gated on again and the secondaries of the power transformer, which are not shown, again deliver current to the load apparatus.

The present invention provides an effective protective circuitry to prevent the destruction of voltage regulating elements, such as transistors or the like, which may be damaged by turn-on transient voltages or line transient voltages. Also, the protective circuitry allows the use of relatively low voltage regulating elements due to efficient suppression of these transients. The detection circuit will act almost instantaneously to remove the gate signal from the silicon controlled rectifiers 16 and 18 whenever a line transient occurs and since current in that controlled silicon rectifier, which is in the conducting state, must be reduced to near zero before it stops conducting, a maximum of 210° of line current will be conducted by a phase line before it opens. In addition, the protective circuitry is readily adaptable for use with many typically regulated power supply circuitries and with many regulated power supply systems.

Obviously many modifications and variations of the present invention are possible in the light of the above teachings. It is therefore to be understood that within the scope of the appended claims the invention may be practiced otherwise than as specifically described.

What is claimed is:

1. A circuit for protecting an A.C. power supply circuit, having at least one phase, from transient voltages comprising
an isolation transformer having a primary winding coupled to said A.C. power supply circuit and a secondary winding for generating a secondary voltage proportional to the line voltage of said A.C. power supply circuit;
rectifier means coupled to said secondary winding of said isolation transformer for rectifying the direction of the secondary voltage;
differential amplifier means coupled to said rectifier means and containing two bistable devices the first of which is conductive when the magnitude of the rectified voltage is below a predetermined level and the second of which is conductive when the magnitude of the rectified voltage is above the predetermined level;

voltage control means coupled between said rectifier means and said differential amplifier means to control the state of conductivity of said first bistable device;

coupling means coupled to said differential amplifier means; and a first network coupled to said coupling means and arranged in one phase of said A.C. power supply circuit;

whereby said first network is activated to permit the transmission of power when the voltage level at the output of said rectifier means is below the predetermined level and is deactivated to impede the transmission of power when the voltage level is above the predetermined level.

2. The system as described in claim 1 wherein said first network comprises a bridge network having two silicon controlled rectifiers coupled to said coupling means and arranged in adjacent arms of said bridge and two diodes arranged in the other two adjacent arms of said bridge.

3. The system as described in claim 2 wherein said bistable devices of said differential amplifier comprise transistors and wherein said differential amplifier further contains feedback means which couples the output of said first bistable devices to the input of said second bistable device.

4. The system as described in claim 3 wherein said voltage control means comprises a Zener diode coupled to a resistor-capacitor network.

5. The system as described in claim 4 wherein said coupling means contains a Zener diode coupled to a transistor.

6. The system as described in claim 5 wherein said A.C. power supply contains three phases.

7. The system as described in claim 1 wherein said first network comprises a diode arranged in parallel with a silicon controlled rectifier coupled to said coupling means wherein the anode of said silicon controlled rectifier is coupled to the cathode of said diode.

8. The system as described in claim 7 wherein said bistable devices of said differential amplifier comprise transistors and wherein said differential amplifier further contains feedback means which couples the output of said first bistable devices to the input of said second bistable device.

9. The system as described in claim 8 wherein said voltage control means comprises a Zener diode coupled to a resistor-capacitor network.

10. The system as described in claim 9 wherein said coupling means contains a Zener diode coupled to a transistor.

11. The system as described in claim 10 wherein said A.C. power supply contains three phases with a second and third network in said second and third phases, respectively, and wherein said second and third networks each comprise a diode arranged in parallel with a silicon controlled rectifier coupled to said coupling means wherein the anode of said silicon controlled rectifiers are coupled to the cathode of said diode.

References Cited
UNITED STATES PATENTS

| | | | |
|---|---|---|---|
| 3,299,347 | 1/1967 | Torii | 323—97 |
| 3,262,015 | 7/1966 | McNamee et al. | 317—20 |
| 3,227,937 | 1/1966 | Koppelmann | 318—237 |
| 3,165,649 | 1/1965 | Ault | 323—22 X |
| 3,124,738 | 3/1964 | Smith | 321—14 |
| 3,114,095 | 12/1963 | Palmer | 323—22 X |

JOHN F. COUCH, *Primary Examiner.*

WARREN E. RAY, *Examiner.*

M. L. WACHTELL, *Assistant Examiner.*